Sept. 23, 1969        T. B. EDDY        3,468,074

ROTATABLE FIXTURE AND EXPANDING MANDREL

Filed Aug. 25, 1966        4 Sheets-Sheet 1

INVENTOR
THEODORE B. EDDY
BY
Robert H. Ware
ATTORNEY

Sept. 23, 1969  T. B. EDDY  3,468,074
ROTATABLE FIXTURE AND EXPANDING MANDREL
Filed Aug. 25, 1966  4 Sheets-Sheet 2

INVENTOR
THEODORE B. EDDY
BY Robert H. Ware
ATTORNEY

Sept. 23, 1969        T. B. EDDY        3,468,074

ROTATABLE FIXTURE AND EXPANDING MANDREL

Filed Aug. 25, 1966        4 Sheets-Sheet 3

INVENTOR
THEODORE B. EDDY
BY Robert H. Ware
ATTORNEY

Sept. 23, 1969     T. B. EDDY     3,468,074
ROTATABLE FIXTURE AND EXPANDING MANDREL
Filed Aug. 25, 1966     4 Sheets-Sheet 4
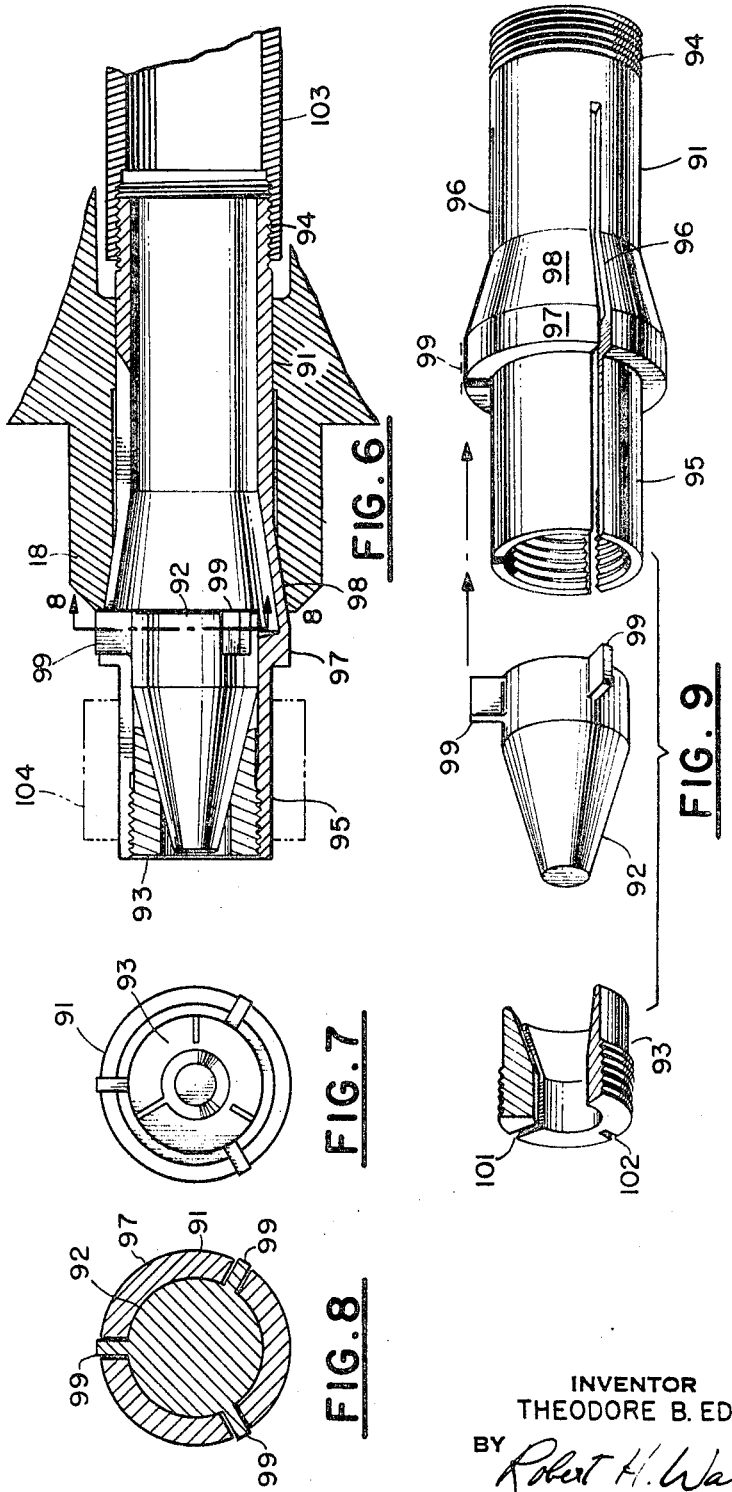
INVENTOR
THEODORE B. EDDY
BY
*Robert H. Ware*
ATTORNEY United States Patent Office 3,468,074
Patented Sept. 23, 1969

3,468,074
ROTATABLE FIXTURE AND EXPANDING
MANDREL
Theodore B. Eddy, R.R. 1, Erickson Road,
New Milford, Conn. 06776
Filed Aug. 25, 1966, Ser. No. 575,031
Int. Cl. B24b 45/00, 47/12
U.S. Cl. 51—216                         11 Claims

ABSTRACT OF THE DISCLOSURE

A machine tool fixture designed to be clamped to a machine tool worktable for supporting a workpiece in rotatable and indexable orientation relative to the worktable, incorporating a casing having a bore extending therethrough, a collet-receiving spindle sleeve rotatably mounted in the bore, a compressed gas motor within the casing producing rotation of the spindle sleeve, and collet-clamping drawbar means cooperating with the spindle sleeve and providing workpiece-clamping and collet-release actuation. Indexing notches and resiliently biased index-latching devices cooperate with the spindle sleeve. The compressed gas motor includes a rotor having radially movable vanes eccentrically journaled in a motor chamber whose end walls are provided with comparatively deep central grooves and comparatively shallow peripheral grooves, supplying compressed gas at a predetermined pressure beneath and between the rotor vanes to rotate the compressed gas motor.

---

This invention relates to portable fixtures designed to be clamped to a machine tool table and adapted to support, index or rotate a workpiece at a work station for machining, and particularly to such portable, rotatable fixtures incorporating a direct drive compressed air motor for maximum convenience and cleanliness, and expanding mandrels useful in such fixtures for gripping ring-shaped workpieces.

Problems of prior art devices

Conventional rotatable fixtures for supporting a workpiece at a work station, often comparable to a lathe headstock or a drill press chuck, are heavy, bulky and awkward. To make them rotatable, such fixtures may incorporate large electric motors or hydraulic-drive devices, introducing dangers of short circuits, electric shocks or leakage of oil at the work station.

Such devices often incorporate gear trains and speed reducers, decreasing their overall efficiency and requiring repeated lubrication and service.

Conventional expanding-gripping mandrel devices for mounting a ring-shaped workpiece in a spindle are complex and expensive, often requiring numerous interfitting parts which must be machined to fine tolerances.

The rotatable fixtures and expanding mandrels of the present invention overcome all of these problems, and provide highly useful and economical assistance to the machine tool operator.

Direct drive and compressed air workpiece rotating fixtures

The rotatable fixtures of the present invention are contained in a compact, sturdy casing which is easily anchored to a machine tool bed, to present the workpiece for machining at a work station. The workpiece is positioned for rotation on either a vertical or a horizontal axis in the path of the machine tool at the work station, as indicated in FIGURES 1 and 2. The workpiece-holding collet is anchored within a rotating sleeve assembly which forms a unitary portion of the rotor of a compressed air motor. The motor is positioned inside the casing, producing direct-drive rotation of the collet and workpiece at the speed selected by the operator, with no danger of electrical shocks or short circuits, or of spillage of hydraulic-pressure fluid at the work station.

Indexed angular positioning of the workpiece is also facilitated by a spring detent index mechanism, and by a single-acting rotary indexing handle which may be mounted on the collet-holding spindle sleeve for angular manual indexing of the workpiece between stationary machining positions.

In addition, the collet clamping assembly is firmly and resiliently biased toward its clamped position, and the collect may be sprung open and the workpiece released by manual actuation of the unique collet clamping assembly release mechanism.

The rotatable fixtures of this invention are well adapted to be used with the unique expanding mandrel shown in FIGURES 6, which may also be employed in conventional collet-clamping spindles.

Accordingly, a principal object of the invention is to provide clean, economical and convenient workpiece clamping fixtures for use with standard machine tools.

Another object is to provide such fixtures capable of rotation or convenient angular indexing of the workpiece.

A further object is to provide such rotatable fixtures incorporating integral compressed air motor units.

Another object is to provide such rotatable fixtures having several alternative axis-of-rotation orientations.

A further object is to provide expanding, workpiece-gripping mandrels for clamping bored or ring-shaped workpieces at the work station of a machine tool.

Other and more specific objects will be apparent from the features, elements, combinations and operating procedures disclosed in the following detailed description and shown in the drawings, in which.

Figure 3:
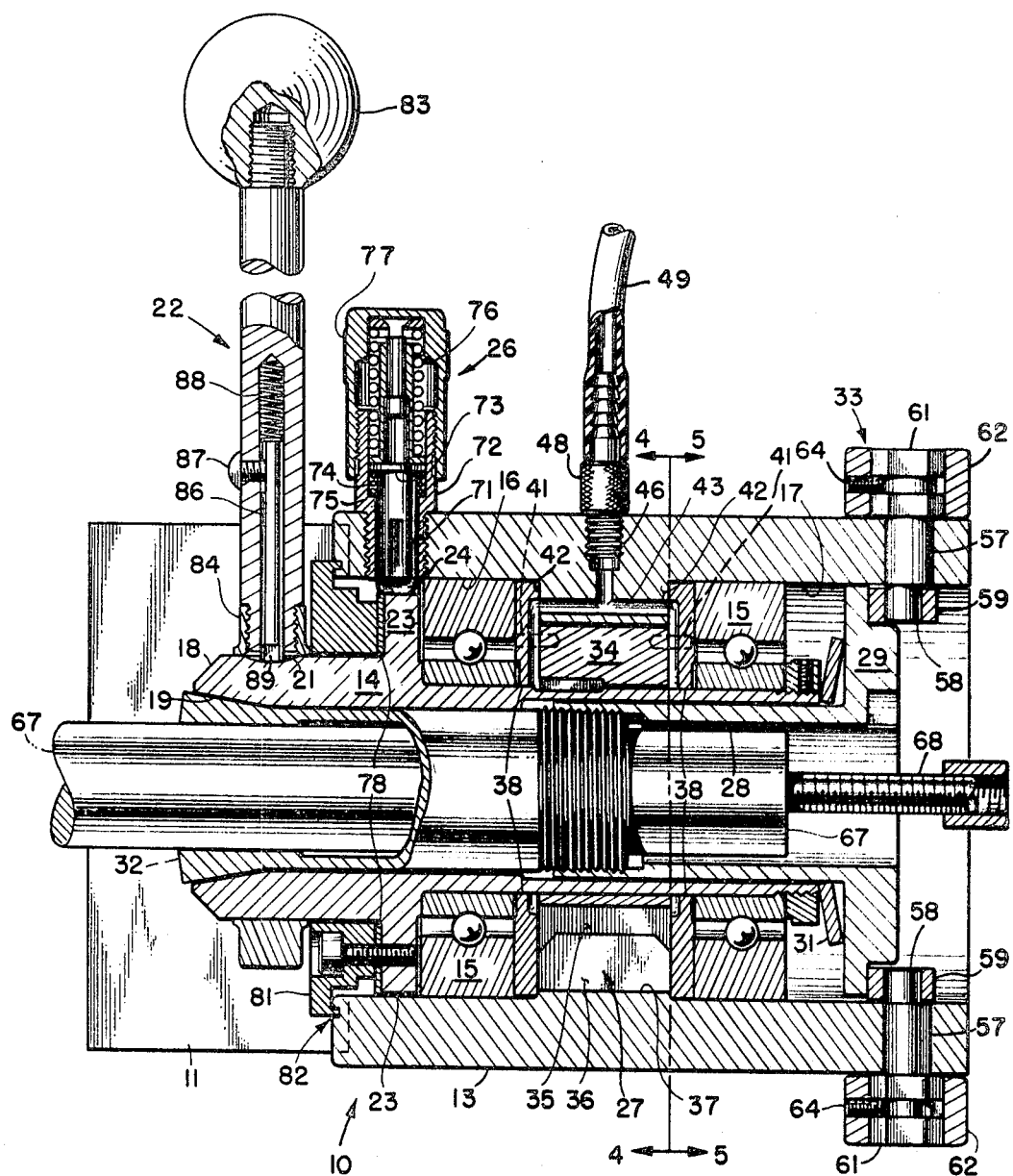
FIGURE 3 is an axial sectional view of the same fixture, taken along the plane 2—2 shown in FIGURE 2.
Figure 4:
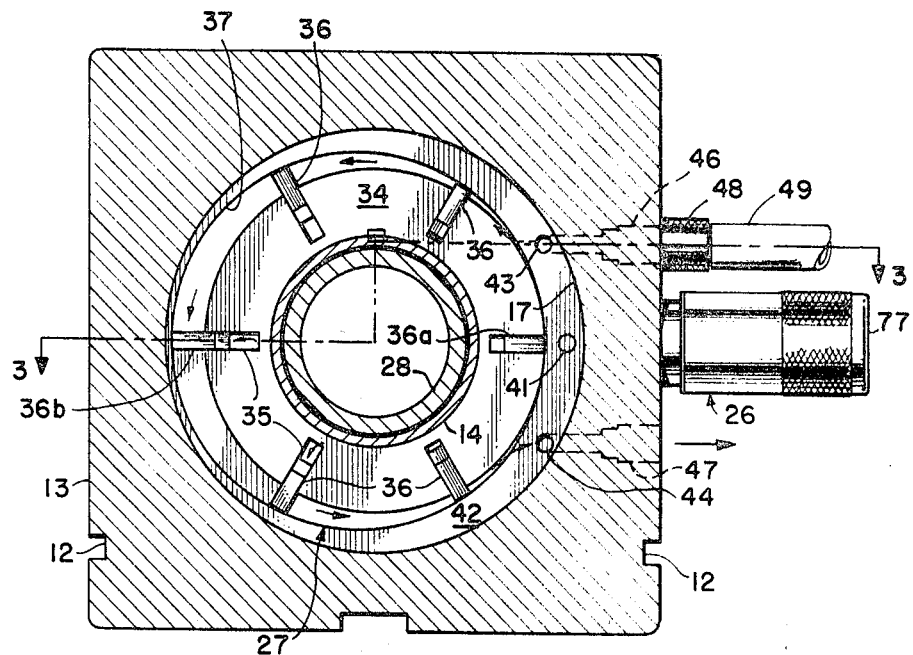
Figure 5:
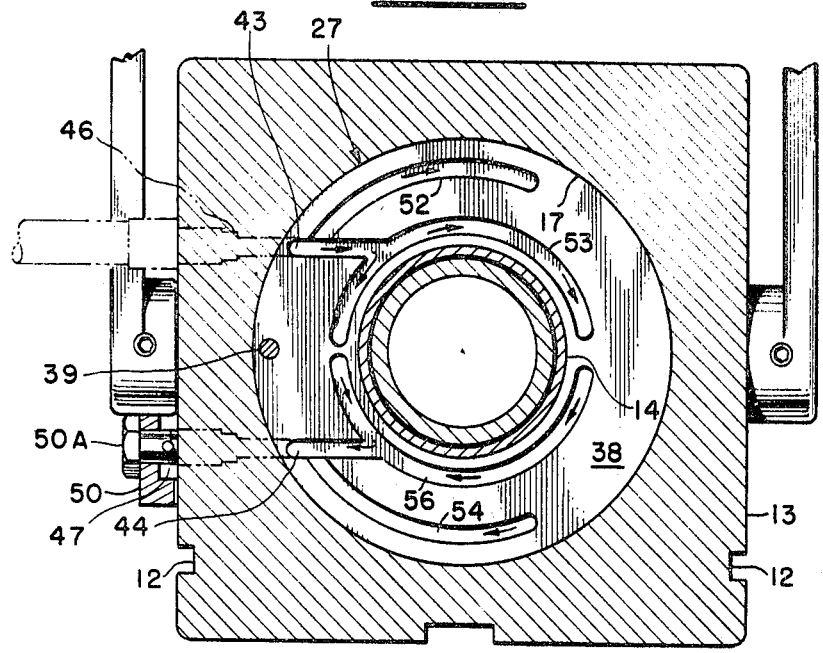

FIGURES 4 and 5 are opposite, back-to-back transverse sectional views of the same fixture, taken along the planes 4—4 and 5—5 shown in FIGURE 3.

FIGURE 6 is an axial sectional view of an expanding mandrel interfitting with the fixture of FIGURES 1–5.

FIGURE 7 is a workpiece-end elevation view of the assembled mandrel of FIGURE 6.

FIGURE 8 is a transverse sectional view of a tapered expander cone incorporated in this mandrel taken along the line 8—8 in FIGURE 7, and FIGURE 9 is an exploded perspective view of the expanding mandrel of FIGURES 6–8.

Rotatable fixtures

Figure 1:
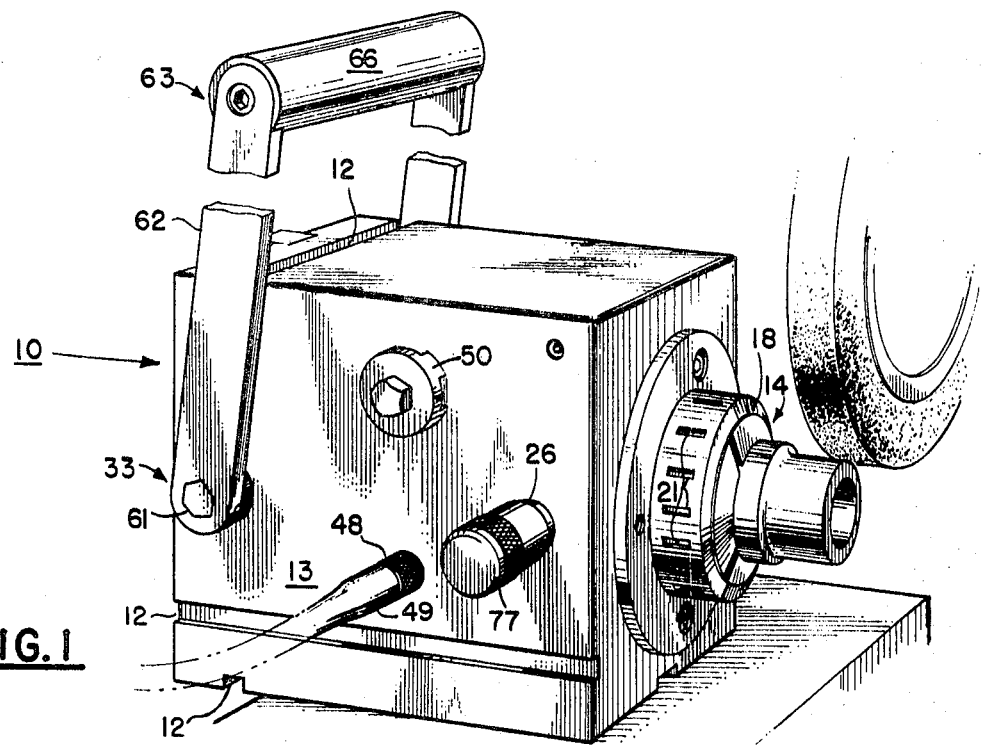
FIGURES 1 and 2 are perspective views of a rotatable fixture of this invention, shown clamped to machine tool tables in two different operating positions.
Figure 2:
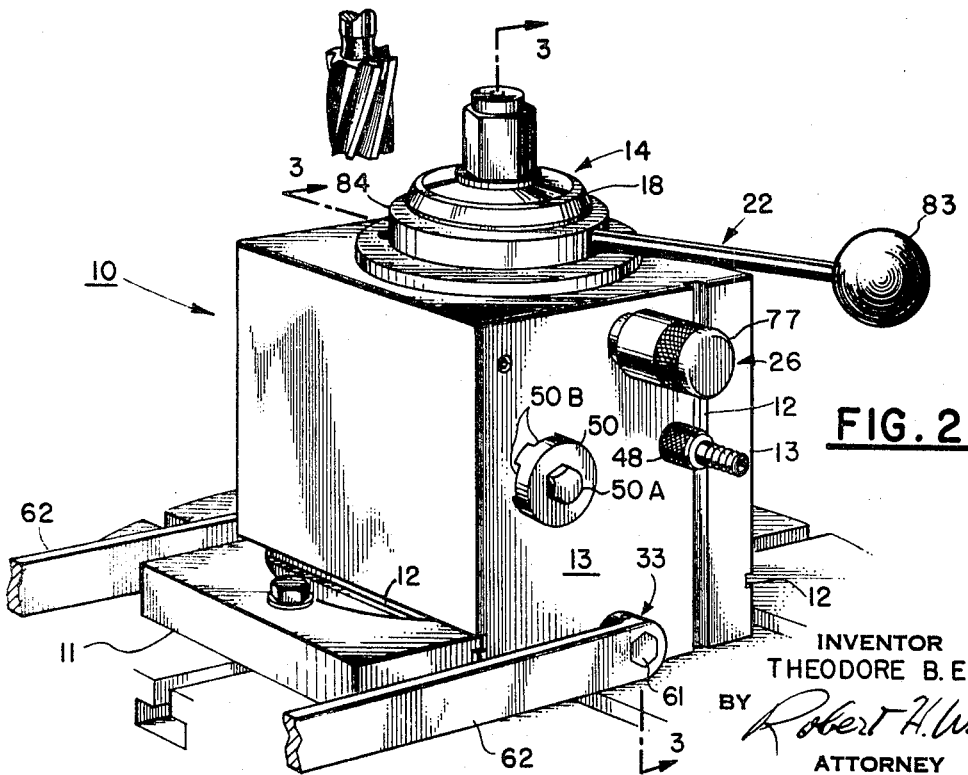

A rotatable fixture 10 incorporating the present invention is shown with its workpiece-rotating axis positioned horizontally in FIGURE 1 and vertically in FIGURE 2. In both of these figures, the fixture 10 is shown positioned on the table of a machine tool at the work station thereof, resting on a different flat machined surface of its outer casing 13. In FIGURE 2 a clamp 11 is shown bolted to a T-slot formed in the worktable of the machine tool to clamp the fixture 10 firmly in an anchored position at the work station, cooperating with suitable clamping grooves 12 formed in the exterior surfaces of the compact casing 13 of the device.

A spindle sleeve 14 shown in FIGURE 3 extends centrally through the casing 13 and is securely mounted for low friction rotation therein in suitable ball bearings 15. Ball bearings 15 are shown with their outer races fitted within enlarged coaxial bores, spindle bore 16 and tail bore 17, formed in opposite ends of the casing 13 and with the inside surfaces of their inner races being anchored, as by a force fit, on the external cylindrical surface of a central sleeve portion of spindle sleeve 14.

The spindle sleeve 14 is thus mounted for low friction rotation within the casing 13. The sleeve 14 is provided with an enlarged spindle end 18 having a chamfered, collet-receiving portal aperture 19 adapted for coaction with the tapered gripping end of conventional collets for securing work-pieces in position at the workstation.

The outer peripheral surface of the spindle end 18 is provided with a series of shallow indexing notches 21 as shown in FIGURE 1 coacting with the removable indexing handle 22, shown in FIGURE 3. Spindle end 18 of sleeve 14 is also provided with a radially extending indexing flange 23 provided with a second series of indexing notches 24 positioned for coaction with a manually-adjustable, spring-biased indexing assembly 26 which may be adjusted by the operator for complete withdrawal for free rotation, and which may be advanced through increasingly-forceful, spring-biased detent-indexing operation to an advanced position in which firm positive clamping force is applied to a notch 24 in the rim of indexing flange 23 to block rotation of spindle sleeve 14 for fixed-position machining of the workpiece held in the spindle.

Collet-gripping components

The compressed air motor assembly 27 shown in FIGURES 3–5 is positioned within casing 13 between the bearings 15 and a collet-clamping drawbar sleeve 28 is provided with an internally threaded collet gripping end dimensioned to extend withdrawably inside the slightly-enlarged central bore of the spindle 14.

The drawbar sleeve 28 is also provided with a clamping flange 29 extending radially outward from its opposite end inside the tail bore 17 and having a collet-clamping inner face normally positioned close to the exposed telescoped end of the sleeve 14 and normally urged away from the sleeve 14 by a spring washer 31. Thus a collet 32, threadedly secured to the collet-clamping drawbar sleeve 28, with its tapered end fitting within the chamfered portal aperture 19 of spindle sleeve 14, is normally drawn into wedging, gripping contact with aperture 19 by the action of spring washer 31 urging sleeve 28 axially away from spindle sleeve 14 in the direction withdrawing drawbar sleeve 28, and thus normally gripping the collet 32 between these two sleeves. Clamping flange 29 of collet clamping sleeve 28 is also provided with an outer face cooperating with the collet release assembly 33 shown in FIGURES 1–3.

Air motor assembly

The air motor assembly 27 mounted on spindle sleeve 14 between the bearings 15 inside casing 13 includes a rotor block 34 keyed on the external cylindrical surface of sleeve 14, as shown in FIGURES 3 and 4. Block 34 is provided with substantially smooth radial end faces and a circular cylindrical external periphery. Rotor block 34 has a plurality of radial vane-grooves 35, all extending radially inward from its external peripheral surface along its entire length between end faces. The grooves 35 extend radially inward over three-quarters or more of the radial thickness of the rotor block 34, as shown in FIGURE 4, and are angularly spaced about the periphery of rotor block 34. For example, there may be six (6) vane-grooves 35 spaced 60 degrees apart around block 34, as shown in FIGURE 4. Removably and slidably positioned within the grooves 35 are a like number of generally rectangular slab-shaped vanes 36. The vanes 36 are free to slide in radial directions from seated positions telescoped inwardly within their grooves 35, as shown by vane 36a at the righthand side of FGIURE 4, to successive radially extended positions between this recessed position and the extreme extended position 36b shown on the lefthand side of FIGURE 4. The rotor block 34 and vanes 36 are mounted for rotation with the spindle sleeve 14 within a circular eccentric motor chamber 37 shown in FIGURES 3 and 4, communicating between the spindle bore 16 and the tail bore 17 in casing 13. A pair of end plates 38 are seated at the base of each of bores 16 and 17, flanking the rotor block 34 and its eccentric motor chamber 37, to enclose and define this closed chamber. These end plates 38 are formed as disks having their outer peripheries closely fitting within the internal base diameter of their respective bores 16 and 17, and having central apertures closely accommodating the spindle sleeve 14, as indicated in FIGURES 3 and 5.

Each of the end plates 38 is provided with a positioning hole 39 cooperating with a positioning pin 41 protruding from the end surface 42 of each of the bores 16 and 17. End surfaces 42 form an eccentric stepped ledge 42 between the bores 16 and 17 and the internal peripheral wall of eccentric chamber 37, as shown in FIGURES 3 and 4.

Passing axially through this inwardly protruding eccentric ledge 42 into communication with both of the bores 16 and 17 are a pair of axial bored holes respectively forming an inlet passage 43 and an outlet passage 44. Passages 43 and 44 communicate respectively with conduits 46 and 47, each passing outward to the adjacent surface of the casing 13. Thus as shown in FIGURES 3 and 4, the inlet passage 43 communicates directly with an inlet conduit 46 in which a suitable hose fitting 48 is threadedly anchored to connect a compressed air hose 49 to the inlet passage 43. The air outlet exhaust conduit 47 may vent outlet passage 44 direct to the atmosphere (FIGURES 3, 4), as shown in FIGURE 1, but a baffle-type muffler cap 50 is preferably held over conduit 47 by an apertured vent cap 50A, as shown in FIGURES 2 and 5 providing a series of circuitous exhaust passages 50B through which air is vented from motor 27 to the atmosphere. The muffler cap 50 reduces the noise made by exhausting air, and improves the self-starting capability of the device, apparently by changing the successive pressure drops throughout the air motor 27 to increase initial starting torque and overcome static friction.

The two exposed ends of the inlet passage 43 communicate directly with a recessed pressure groove formed in the inner faces of both end plates 38, which overlie the exposed parallel end faces of ledge 42. These pressure grooves 51 preferably take the form shown in FIGURE 5, and the groove patterns in the two plates 38 are substantially mirror-image designs. An outer groove 52 communicating with the chamber 37 over about 90 degrees of its periphery extends from inlet passage 43 in the direction of the extended-vane position 36b. Also communicating with inlet passage 43 is an inner groove 53, preferably deeper and extending around substantially one-half of the inner periphery of the face of each end plate 38 and extending angularly toward and near the diametral plane of positioning hole 39, midway between passages 43 and 44. Compressed air entering chamber 37 through inlet passage 43 and the inner groove 53 tends to urge the vanes 36 outward in their vane grooves 35 as rotor block 34 revolves, while compressed air entering the chamber 37 through the outer groove 52 pressurizes the "expanding" or "driving" sectors of the chamber 37 defined by rotor block 34 and the successive pairs of vanes 36, as indicated in FIGURE 4, with the unbalanced exposed areas of the successive vanes 36 producing resultant torque tending to rotate the rotor block 34 and spindle 14.

A corresponding configuration of recessed outlet grooves 54 and 56 formed in a substantial mirror-image on the opposite half of the inner face of each end plate 38 supplies exit passages for the air expelled from the diminishing sectors of the chamber 37 as rotation of rotor block 34 drives vanes 37 inwardly to reduce the volumes of these sectors of the chamber as well as the smaller volumes of air trapped within vane grooves 35 by vanes 36. Air from both of these regions is exhausted through outlet grooves 54 and 56 via outlet passage 44 and outlet conduit 47 to the atmosphere, as indicated in FIGURE 5.

I have discovered that the outer grooves 52 and 54 may be much less deep than the inner grooves 53 and 56, apparently because slight leakage of compressed air past vanes 36 and the ends of rotor block 34 supplements the air supplied by the outer grooves. Outer groove depths of 0.003″ and inner groove depths of 0.060″—a 20:1 groove depth ratio—have produced highly effective air motors 27 with good starting torque and excellent low speed running torque, these being extremely useful characteristics of air motors rotating a workpiece by direct drive, such as those of this invention.

Close tolerances are observed in the machining of the components forming the air motor assembly 27 to minimize air leakage and enhance the effectiveness of the air motor 27 in rotating the spindle sleeve 14 and the workpiece supported therein by direct driving torque. Close speed control is achieved by the operator's actuation of a valve in compressed air supply conduit 49, further enhancing the convenience of these rotatable fixtures 10.

Collet release assembly

The collet release assembly 33 shown at the right side of FIGURE 3 includes a pair of short release shafts 57 respectively journalled in bores joining the tail bore 17 with the outer faces of casing 13 on opposite sides thereof. Protruding inward from the ends of the release shaft 57 are eccentric release studs 58 on which release sleeves 59 are mounted. The outer ends of both release shafts 57 are preferably formed with a large hexagonal alignment heads 61 as shown in FIGURES 1, 2 and 3, and mating hexagonal holes formed in the legs 62 of a release handle 63 are fitted over these hexagonal alignment heads 61 and secured thereon by set screws 64. A hand grip 66 is secured between the opposite ends of legs 62 to complete the U-shaped assembly of release handle 63 straddling casing 13 and freely pivotable about the axis of the coaxial release shafts 57 journalled in the casing 13, as indicated in FIGURES 1-3. The release sleeves 59 mounted on the eccentric stud portions 58 of the release shaft 57 are presented for engagement with the outer face of clamping flange 29 of the collet clamping drawbar sleeve 28, which is held in contact with these release sleeves 59 by the resilient urging of the dished spring washer 31.

A workpiece 67 is shown clamped in collet 32 in FIGURE 3, and the depth to which workpiece 67 is telescoped within collet 32 is preferably limited by a workpiece-positioning screw 68, adjustably threaded in a positioning bar 69 spanning the open end of tail bore 17.

Indexing assemblies

The indexing assembly 26, cooperating with notches 24 in the rim of flange 23, includes an indexing plunger 71 slidably held within a tubular sleeve bushing 72 threaded into a suitable tapped hole in casing 13 aligned with flange 23. A light helical compression spring 74 is compressed between an upper radial flange 73 on plunger 71 and a ledge 75 inside bushing 72, resiliently biasing plunger 71 away from flange 23.

A compressible, resilient biasing core assembly 76, incorporating a telescoping rod-and-sleeve urged apart by a heavy compressed coil spring, depressible to a minimum limit length, is captive between flange 73 and an enclosing cap 77 threaded on bushing 72, as shown in FIGURE 3.

Cap 77 can be unscrewed to reduce the compression of the core assembly 76, until spring 74 urges plunger 71 away from flange 23, disengaging it from notches 24. Spindle sleeve 14 then rotates freely as compressed air is supplied to air motor 27.

Alternatively, cap 77 may be screwed down to compress core 76 until it overrides spring 74, applying succesively greater resilient biasing force urging plunger 71 into indexing notches 24.

Finally, cap 77 may be further screwed down until compressible core 76 is reduced to its minimum limit length, forming a substantially solid plug applying firm locking force clamping plunger 71 in a particular notch 24.

Flange 23 may be provided with a large number of indexing notches 24; in order to provide a selectable lesser number of index positions for spindle sleeve 14, an adapter disk or plate 78 having two, four, six or any number of rim notches less than those formed in flange 23 may be mounted abutting flange 23 with its rim notches aligned with notches 24 and with the edge of plunger 71, as shown in FIGURE 3. The plunger then interfits with flange 23 and index sleeve 14 only at angular positions where it engages a rim notch of plate 78 aligned with a notch 24 in flange 23. Adapted plate 78 is preferably secured to flange 23 by a cover screw 79 holding a cover plate 81 in peripheral concentric grooves 82 on the end face of casing 13, closing the collet end of spindle bore 16.

The indexing handle 22 is employed by the operator for manual angular positioning and indexing of spindle sleeve 14. A handgrip ball 83 is preferably threaded on the stem of the handle 22, whose opposite end is secured to spindle ring 84 closely and removably fitting over the spindle end 18 of spindle sleeve 14, aligned with indexing notches 21 therein.

A detent rod 86 is resiliently depressibly mounted within and held by a retaining screw 87 in an axial bore 88 in the stem of handle 22, with its end protruding from bore 88 within ring 84 for engagement with notches 21, this protruding end of rod 86 is preferably beveled on its hidden rear side in FIGURE 3 and provided with a flat surface 89 on its front side, in the manner of a depressible door latch.

As indicated in FIGURE 1, the indexing notches 21 are defined by radially concave surfaces milled into the periphery of spindle end 18 of the spindle sleeve 14, and the sides of these notches are bounded by substantially parallel axial, "kerf" planes like those left by a milling cutter, for example. The flat face 89 of the protruding end of indexing rod 86 engages the clockwise axial mounting face of each notch 21 (viewed from the left in FIGURE 3). Handle 22 thus transmits torque directly to spindle sleeve 14 as the handle is rotated about the axis of sleeve 14 in a clockwise direction as viewed in FIGURE 1 and FIGURE 2, for example. By contrast, counterclockwise rotation of handle 22 about the axis of spindle sleeve 14 will produce free ratcheting rotation of ring 84 relative to spindle end 18 of sleeve 14 as successive counterclockwise axial boundary or "kerf" planes of successive notches 21 in turn cause detent rod 86 to be cammed and telescopingly depressed within bore 88 in the stem of handle 22.

By sliding ring 84 outwardly off and away from spindle sleeve 14 and reversing the handle by rotating ring 84 180 degrees about the axis of the handle 22, the ring 84 may again be installed by telescoping sliding engagement on spindle end 18, with flat face 89 now facing in a counter-clockwise direction, producing counterclockwise indexing movement of workpiece 68 and providing clockwise free ratcheting movement of handle 22 about spindle end 18 of spindle sleeve 14. Indexing of spindle sleeve 14 by handle 22 is independent of the indexing detent operation of indexing assembly 26, but tightening of assembly 26 to its locked position overrides handle 22, and clamps sleeve 14 against angular movement.

Expanding mandrel

A need has long existed for a simple, compact expanding mandrel suitable for positioning ring-shaped workpieces for indexing or rotation on a machine tool spindle, and the expanding mandrel shown in FIGURES 6, 7 and 8 fills this need effectively and economically. In addition this expanding mandrel may be combined with the rotary fixtures 10 of this invention to provide an unusually effective indexing and rotary fixture for supporting annular workpieces at a machining station above the tables of standard machine tools. Conventional expanding collets often employ a central through-bolt with a tapered, wedge-shaped head which is axially telescoped within the collet by threaded advance or similar means, to spread the outer jaws, forcing them outward by sliding engagement with its advancing tapered surface against internal tapered surfaces on such jaws. Such expanding collets thus require special tightening and loosening adjustments by the machine operator, and they are not automatically self-expanding to grip the inside of an annular workpiece in the manner that a collet automatically engages with its workpiece.

The expanding mandrels of the present invention are automatically expanded by standard drawbar engagement within the spindle nose of the rotatable fixture 10 or any standard machine tool spindles, without special tightening or loosening operations. As shown in FIGURES 6–9, these expanding mandrels preferably incorporate three separate cooperating members: a tubular-slotted mandrel body 91, a tapered expander cone 92, and a split expander ring 93. The mandrel body 91 is generally tubular in shape, with an external drawbar end 94 threaded to engage a standard machine tool drawbar 103 as does a standard collet. The opposite or expanding end 95 of the mandrel body 91 is internally threaded and provided with a plurality of axial slots 96 passing radially entirely through the wall of the mandrel body from its expanding end 95 along a substantial portion of its length, as shown in FIGURES 6 and 9. The central portion of mandrel body 91, about midway along the lengths of slots 96, is formed as enlarged radially protruding portion 97 joined by a collet-type taper 98 to the external wall surface of normal collet diameter contiguous with the drawbar end 94 of the mandrel body 91, as shown in FIGURES 6 and 9. The outside diameter of expanding end 95 of mandrel body 91 is chosen to fit slidably within the central aperture of the ringshaped workpiece 104, as shown in FIGURE 6.

Slidably telescoped within the expanding end 95 of the mandrel body 91 is the tapered expander cone 92. At its drawbar end, the expander cone 92 is provided with radially protruding lugs 99 dimensioned to extend radially through slots 96 and beyond the large protruding portion 97 of the mandrel body 91. The opposite end of expander cone 92 is tapered convexly at an angle of 15 to 20 degrees from the axis of the concentric components to provide an expansion ramp positioned within expanding end 95, when cone 92 is slidably installed within mandrel body 91, as shown in FIGURE 6. The split expander ring 93 is an elongated, ring-shaped member dimensioned to be telescopingly and threadedly engaged within the tubular expanding end 95 of mandrel body 91. Ring 93 is provided with external threads at its outer end, opposite the drawbar end of the assembly, engaging the internal threads in the expanding end 95 of the body 91, as shown in FIGURE 6. The remaining external wall surface of the ring 93 is dimensioned for free sliding engagement within the internal wall of the tubular expanding end 95 of body 91. The drawbar end of ring 93 is internally tapered to match the external taper of 15 to 20 degrees on the expander cone 92, and ring 93 is provided with a single slot 101 passing entirely through its wall over the entire length of ring 93 to divide it into a C-shaped expansible member. One or more additional partial slots 102 may also be formed in ring 93 passing partway through its wall thickness at positions spaced angularly from slot 101 about its periphery to assure that its external threads are engaged with the internal threads in expanding end 95 of body 91 even under expanding deformation of these parts.

It will be seen from FIGURE 6 that the assembled expanding mandrel with ring 93 surrounding cone 92 and threaded within body 91, with lugs 99 protruding through slots 96, may be inserted in the spindle end of the fixture 10 or a similar machine tool spindle, with the external threads on drawbar end 94 of mandrel body 91 being engaged by a standard internally threaded drawbar 103. Axial movement of the drawbar 103 away from the spindle 18 causes the external taper 98 on body 91 to engage the internal taper within spindle 18 initially contracting and urging inwardly the sectors of body 91 defined by the slots 96 and thus assuring that expanding end 95 of body 91 is in firm threaded engagement with ring 93. As drawbar end 94 continues to move to the right in FIGURE 6, the face of spindle 18 engages lugs 99 and blocks the movement of cone 92 to the right. When the external taper of cone 92 engages the internal taper of ring 93, further axial movement of the mandrel assembly is blocked and force applied to drawbar 103 tending to move it further to the right has the effect of wedging cone 92 within ring 93 and producing expansion of the C-shaped ring 93 by widening its slot 101, causing expansion of the slotted expanding end 95 of body 91 by widening the slots 96 at their outer ends on expanding end 95. Thus the separate sectors of body 91 protruding from spindle 18 are expanded by the expansion of ring 93 produced by the wedging and telescoping engagement therein of cone 92 until the ring-shaped workpiece 104 surrounding expanding end 95 has its internal periphery firmly gripped and anchored by the expanding end 95 of body 91.

The expanding mandrels of this invention thus cooperate effectively with the standard spindle and drawbar assemblies of conventional machine tools, and also with the collet-clamping drawbar sleeve 28 mounted within spindle sleeve 14 in the rotatable fixtures 10 of the present invention, to provide an unusually effective indexable and rotatable workpiece-holding fixture for mounting on the tables of standard machine tools. The fixtures 10 of this invention are thus easily adapted for use with hollow, tubular or ring-shaped workpieces or for conventional round workpieces gripped within standard collets.

While the objects of the invention are efficiently achieved by the preferred forms of the invention described in the foregoing specification, the invention also includes changes and variations falling within and between the definitions of the following claims.

I claim:
1. A rotatable fixture for supporting a workpiece on a work table comprising, in combination:
  (A) a casing provided with means for clamping it to the table, and with means forming an open ended spindle bore and a concentric tail bore therein joined by an eccentric chamber,
  (B) a collet-receiving spindle sleeve protruding from and rotatably mounted in the spindle bore,
  (C) means mounted in the eccentric chamber between the casing and the spindle sleeve forming a compressed gas motor for producing direct drive rotation of the spindle sleeve,
  (D) and collet-clamping drawbar means in the tail bore,
    (1) positioned to grip and eject a standard collet inserted in the collet-receiving spindle sleeve, and
    (2) normally biased away from the spindle sleeve,
    (3) with the casing having collet-ejecting means engageable with the drawbar means to move it toward the spindle sleeve.
2. The fixture defined in claim 1 including:
  (A) a pair of grooved plates
    (1) each positioned spanning one of the bores facing and bounding the eccentric chamber,
    (2) and each provided with means forming grooves in its surface facing the eccentric chamber connecting compressed gas inlet and outlet conduits to the periphery of the chamber,
  (B) and vaned rotor means

(1) sub-dividing the periphery of the chamber into sector of progressively differing volume,
(2) extending axially between and substantially filling the axial distance between the plates,
(3) and keyed to the spindle sleeve to rotate it by direct driving torque.

3. The combination defined in claim 2 wherein the rotor is provided with radial vanes slidably mounted in radial slots, and the plates are provided with comparatively deep central grooves conducting compressed gas to the inner ends of the slots to drive the vanes outwardly, and with comparatively shallow peripheral grooves conducting compressed gas to the chamber sectors.

4. The combination defined in claim 1 in which a spring washer is depressed in engagement with a radial flange on the drawbar means to bias it away from the spindle sleeve, with manually pivotable eccentric camming means journalled in the casing positioned to counteract the force applied by the spring washer.

5. The combination defined in claim 1 in which the casing is provided with indexing means coacting with indexing notches formed on the periphery of the spindle sleeve to hold the spindle sleeve in at least one predetermined angular position and prevent its rotation therefrom.

6. The combination defined in claim 5 in which the indexing means is normally disengaged from the spindle sleeve to permit its free rotation, and is advanceable to a resiliently-biased latching position applying clamping force to the spindle sleeve which may be overcome by a positive torque applied thereto.

7. The combination defined in claim 6 in which the indexing means may be freely shifted between its locked position, its disengaged position and a positive locking position in which it blocks rotation of the spindle sleeve from at least one predetermined angular position.

8. The combination defined in claim 6 including a removable indexing handle engageable with the spindle sleeve to extend radially therefrom for applying the positive torque thereto.

9. The combination defined in claim 1 in which the casing is provided with an exhaust port having baffle means to direct exhaust gas issuing from the gas motor along a non-straight path to the space surrounding the casing.

10. A compressed gas motor comprising in combination:
(A) a chamber bounded by a cylindrical peripheral surface and end walls substantially perpendicular to the surface,
(B) a vaned rotor mounted for rotation within the chamber on an axis parallel to the generatrices of the cylinder, extending axially between and substantially filling the axial distance between the end walls, with radial vanes slidably mounted in radial slots therein extending toward the cylindrical surface to subdivide the periphery of the chamber into sectors of progressively differing volume,
(C) with the end walls being provided with comparatively deep central grooves conducting compressed gas to the inner ends of the radial slots to drive the vanes outwardly, and with comparatively shallow peripheral grooves conducting compressed gas to the chamber sectors,
(D) and compressed gas supply means connected to deliver compressed gas at a predetermined pressure to the deep central grooves and the comparatively shallow peripheral grooves in said end walls, whereby the deep central grooves deliver the compressed gas to the radial slots to drive the vanes outwardly while the shallow peripheral grooves deliver the compressed gas to the chamber sectors to rotate the vaned rotor.

11. The combination defined in claim 10 in which the depths of the deep and shallow grooves are in the ratio of approximately 20 to 1.

References Cited

UNITED STATES PATENTS

| | | | |
|---|---|---|---|
| 2,348,292 | 5/1944 | Gross | 269—70 X |
| 2,393,223 | 1/1946 | Rosen | 91—138 |
| 2,413,678 | 1/1947 | Beverlin | 51—237 |
| 2,453,309 | 11/1948 | Douglas | 91—138 |
| 2,495,438 | 1/1950 | Bentley | 269—70 |
| 2,515,210 | 7/1950 | Garberding. | |
| 3,080,851 | 3/1963 | Zizka | 91—138 |
| 3,295,262 | 1/1967 | Brown | 51—134.5 X |

FOREIGN PATENTS

| | | |
|---|---|---|
| 427,229 | 3/1926 | Germany. |

HAROLD D. WHITEHEAD, Primary Examiner

U.S. Cl. X.R.

51—237; 91—138; 269—70